MEMORY CONTROLLED SHIFT REGISTER DISPLAY DEVICE

Filed Jan. 7, 1966

INVENTOR.
ROBERT W. KEYES
BY
ATTORNEY

United States Patent Office 3,445,827

Patented May 20, 1969

3,445,827

MEMORY CONTROLLED SHIFT REGISTER DISPLAY DEVICE

Robert W. Keyes, White Plains, N.Y., assignor to International Business Machines Corporation, Armonk, N.Y., a corporation of New York Filed Jan. 7, 1966, Ser. No. 519,252

Int. Cl. G11b *5/00*

U.S. Cl. 340—173 1 Claim

ABSTRACT OF THE DISCLOSURE

This display includes a plurality of electroluminescent diodes. Each diode is controlled by a coupled bistable device. The bistable devices are connected together to form two separate shift registers, each having a separate input terminal. The pattern to be displayed is controlled by selectively applying signals to these input terminals. The binary words representing the various patterns to be displayed are stored in two separate sections of a memory, which sections are read out in parallel and the binary words are transferred to the corresponding shift registers.

The present invention relates to electronically activated display devices and more particularly to novel electronic circuitry for controlling matrices of electrically controllable light emitting devices to display a variety of different characters and patterns.

Display devices formed of matrices of electrically actuable light emitting devices are well known in the art. In one common form of display the light emitting devices are arranged adjacent to each other in columns and rows. Electrical circuitry is provided which is connected to individual elements, or groups of elements that are always turned on and off together to selectively control the light emitting devices to display different patterns and characters. Since a different combination of tubes must be lit for each different pattern to be displayed, the control circuitry connected the individual light emitting devices and groups of the devices is coupled to logical circuitry which is in turn controlled by inputs representative of the particular characters to be displayed. This type of circuitry is expensive, requires individual connections from the logical circuitry to each of the neon tubes and is usually restricted in the number of patterns and characters which can be displayed without making physical changes in the circuit connections. These limitations are particularly restrictive when electrical displays are fabricated using electroluminescent diodes rather than neon tubes for the light emitting elements and particularly so when the diodes and associated control circuitry are fabricated as integrated circuits on one or more substrates. In structures of this type it is important to minimize the number of external connections which must be made to the devices on the substrate and the nature of the integrated structure is such that it is either impossible to change the internal connections or changes can be made only with great difficulty.

In accordance with the principles of the present invention improved electronically controlled displays are provided which require a minimum number of inputs, which are completely flexible in that any combination of the light emitting devices may be energized to display any pattern without altering the electrical connections, and which lends itself easily to fabrication in integrated circuit form. One embodiment of the invention illustrated herein includes a plurality of electroluminescent diodes arranged in a display matrix with each diode being controlled by one of a plurality of bistable devices which are connected together to form a register. The pattern displayed by the diodes is determined by the binary word entered in the bistable devices of the register and the pattern displayed may be changed merely by entering an appropriate new binary word in the register. Entry of the binary words is accomplished by applying a series of signals to an input terminal for the register with the interconnections betwen the bistable devices providing the means for advancing the input information serially through all the stages of the register. In another embodiment disclosed herein two registers are formed by interconnection between the bistable devices controlling the electroluminescent diodes and binary words and entered in each register by appropriate series of signals applied to the input terminals for the registers. The binary words representing the various patterns to be displayed are stored in a memory from which a selected word or words corresponding to a pattern to be displayed are read out to provide the series of input signals which are applied to the input terminal of the register or registers formed by the bistable devices which control the display. The diodes and bistable devices are mounted in a single register display package which requires only one information input for each register in the display. Further any display pattern may be generated merely by applying the appropriate series of input signals to the input terminal for each register. Though the bistable devices in the embodiments disclosed herein are connected to form coventional shift registers, different types of connections between these bistable devices forming the register may be made. One such obvious modification is where the registers are connected to form counters in which case the binary word stored is determined by the number of input signals applied to the input terminal.

Therefore it is an object of the present invention to provide an improved electronically controllable pattern display device.

It is a more specific object to provide an electronically controllable electronic display device which is completely flexible and can be controlled to display any pattern.

It is a further object to provide an electronically controllable display device which requires a smaller number of external inputs to the elements forming the display.

It is another object of this invention to provide a display register which itself includes a plurality of light emitting devices controlled by one or more registers formed of interconnected bistable devices physically arranged in close proximity to the light emitting devices so that the display register can be controlled by inputs serially applied to the one or more registers and does not require individual input connections to the light emitting and bistable devices.

It is a further object to provide an electronically controllable display register which can be easily fabricated out of integrated circuits.

The foregoing and other objects, features and advantages of the invention will be apparent from the following more particular description of preferred embodiments of the invention, as illustrated in the accompanying drawings.

Figure 1:
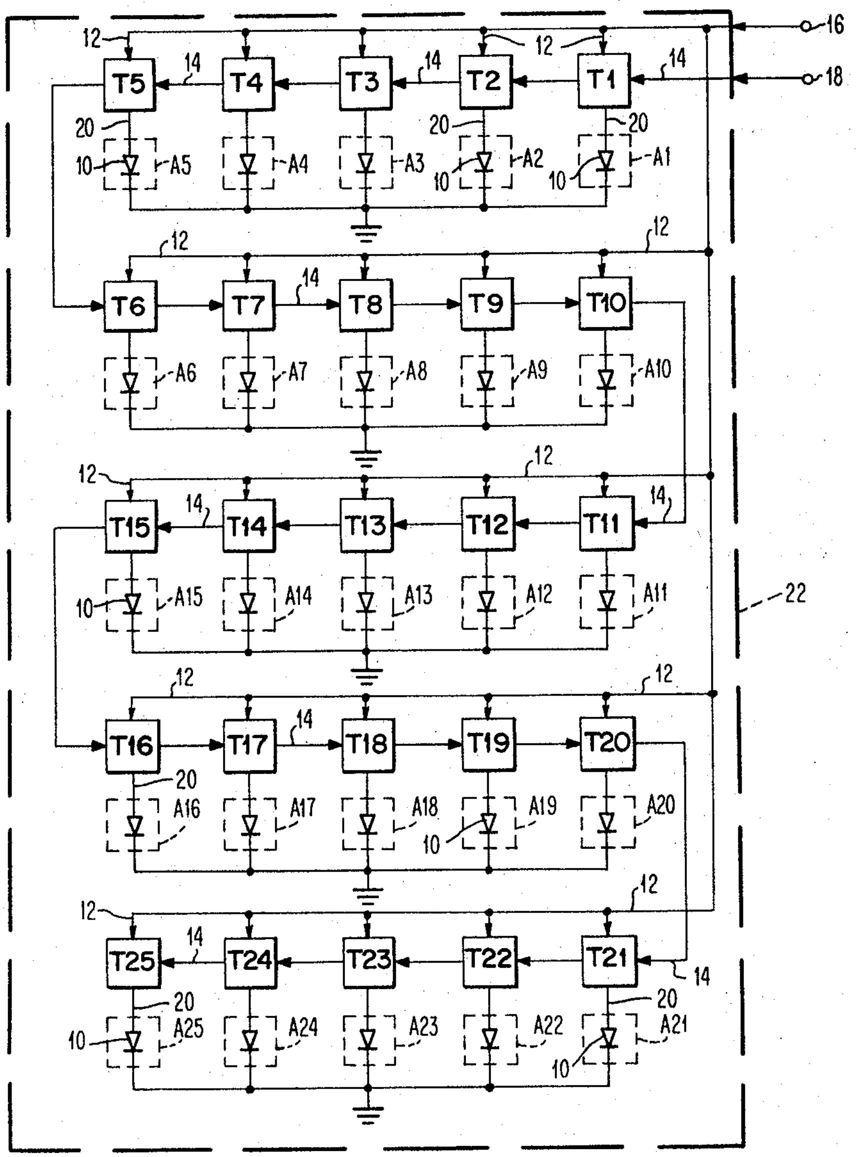
FIGS. 1 and 2 are electrical circuit diagrams of two embodiments of display registers constructed in accordance with the principles of the present invention.

Referring now to FIG. 1, there is shown in block diagram form an electrical circuit diagram of a display register embodying the principles of the present invention. The display includes twenty-five electroluminescent diodes 10, each of which is shown in a dotted block. The dotted blocks are designated A1 through A25 and these designations are employed in this specification to indicate the position of the diodes in the five by five matrix in which they are arranged. The circuit also includes twenty-five bistable devices T1 through T25 which are arranged to form the successive stages of a twenty-five position shift register. Each stage of the shift register is provided with an advance input 12 and an information input 14. The advance inputs 12 are connected to a terminal 16 to which pulses are applied to advance information through the shift register. The output of each stage is connected to the information input 14 of the successive stage and the design is such that each time an advance pulse is applied at terminal 16 the binary value one or zero in each stage of the shift register is transferred to the succeeding stage. There is no output from the last stage T25 and information in this stage is spilled over or lost when an advance pulse is applied.

A further input to the shift register is an input terminal 18 which is connected to the input of the first stage T1 and it is to this input that signals representative of new binary information are applied to the register. Each stage of the shift register is also provided with an output line 20 which is connected to an associated one of the electroluminescent diodes 10 and the design is such that when the particular bistable device is in a binary one condition a circuit is completed through the associated diode 10 to turn the diode on. The diode continues to emit light as long as the bistable device remains in the one condition and no light is emitted when the associated bistable device is in a zero condition. The over-all display register circuit of FIG. 1 is shown within a block designated 22 and a block diagram illustration of this display register of FIG. 1 is shown in 1A. It is this illustration that is used in the circuit diagram of FIG. 4 which is described in detail below, The grouping of the diodes 10 and bistable devices A1 through A25 within block 22 emphasizes the preferred physical construction of the display, that is with the bistable devices mounted physically adjacent to the diodes to form a single package which includes the electrical connections between the diodes and bistable devices. Then only a minimum number of external connections need be made to the package to contact the device to display any desired pattern.

Figure 3A:
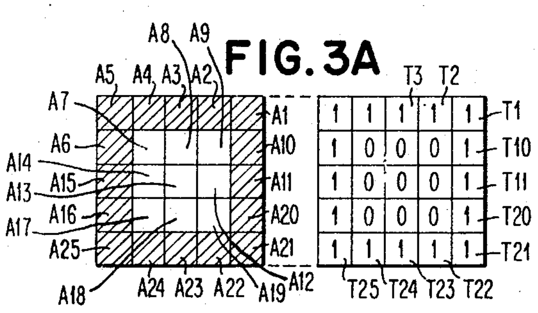
FIGS. 3A through 3J illustrate the manner in which the display registers of FIGS. 1 and 2 display different characters.
Figure 3B:
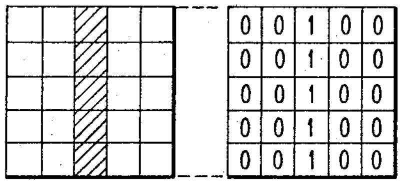
Figure 3C:
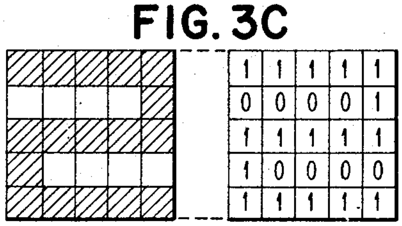
Figure 3D:
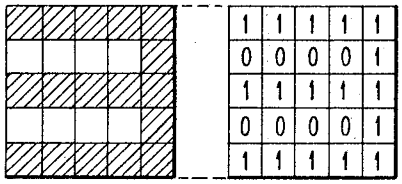
Figure 3E:
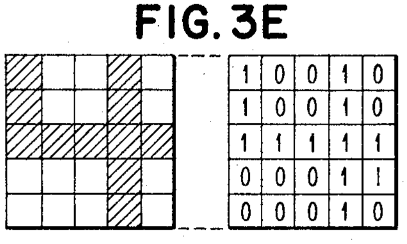
Figure 3F:
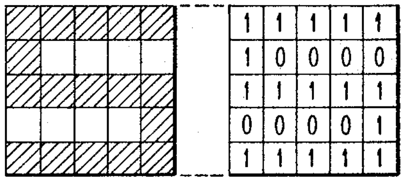
Figure 3G:
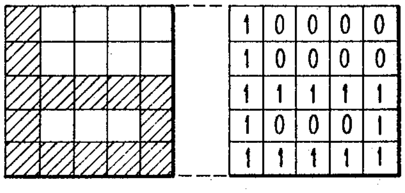
Figure 3H:
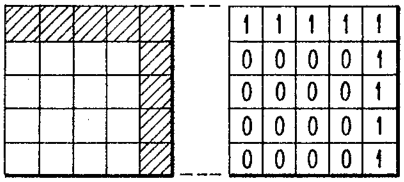
Figure 3I:
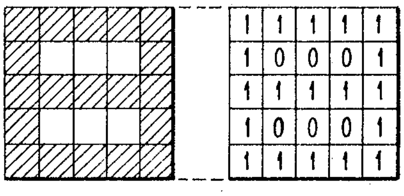
Figure 3J:
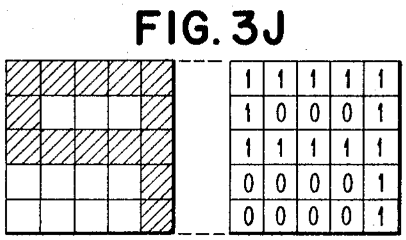

However, before discussing the circuit diagram of FIG. 4, the manner in which the diodes 10 of FIG. 1 are arranged to form a matrix to display characters under control of binary information entered in the stages of the shift register is described with reference to FIGS. 3A through 3J. Each of these figures includes two five by five block matrices, with the block on the left representing the diodes in positions A1 through A25 and the block on the right representing the twenty-five stages T1 through T25 of the shift register of FIG. 1. Each stage of the shift register is as shown in FIG. 1 connected to a diode in a corresponding one of the positions A1 through A25. In FIGS. 3A through 3B the cross hatching in the blocks at the left of each figure indicates the electroluminescent diodes which are emitting to form the desired character. The blocks at the right of each figure indicate the pattern of ones and zeros in the various stages of the shift register required to display this character. Thus to display a zero as shown in FIG. 3A, the shift register must have binary ones in stages T1 through T5, T6, T10, T11, T15, T16, T20 and T21 through T25. The twenty-five digit binary word which must be entered in the shift register to establish this condition is 11111 10001 10001 10001 11111.

The light emitting diodes in positions A1 through A25 which are on and the binary words required to be stored in the shift register stages T1 through T25 to turn these positions on is shown in FIGS. 3B through 3J for the decimal numerals 1 through 9. In order to enter any of these patterns in the shift register, it is only necessary to serially enter the correct twenty-five digit number at the input terminal 18 (FIG. 1) and apply the appropriate advance pulses to the advance terminal 16. The first digit to be entered according to the convention used herein is the digit at the left of the string and this digit after completion of the entry and shift operation is placed in stage T25 of the shift register.

Figure 1A:
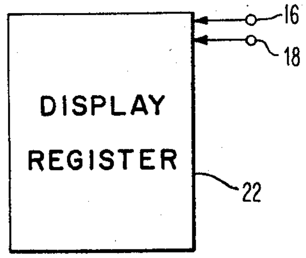
FIGS. 1A and 2A are block representations of the display registers of FIGS. 1 and 2, respectively.
Figure 4:
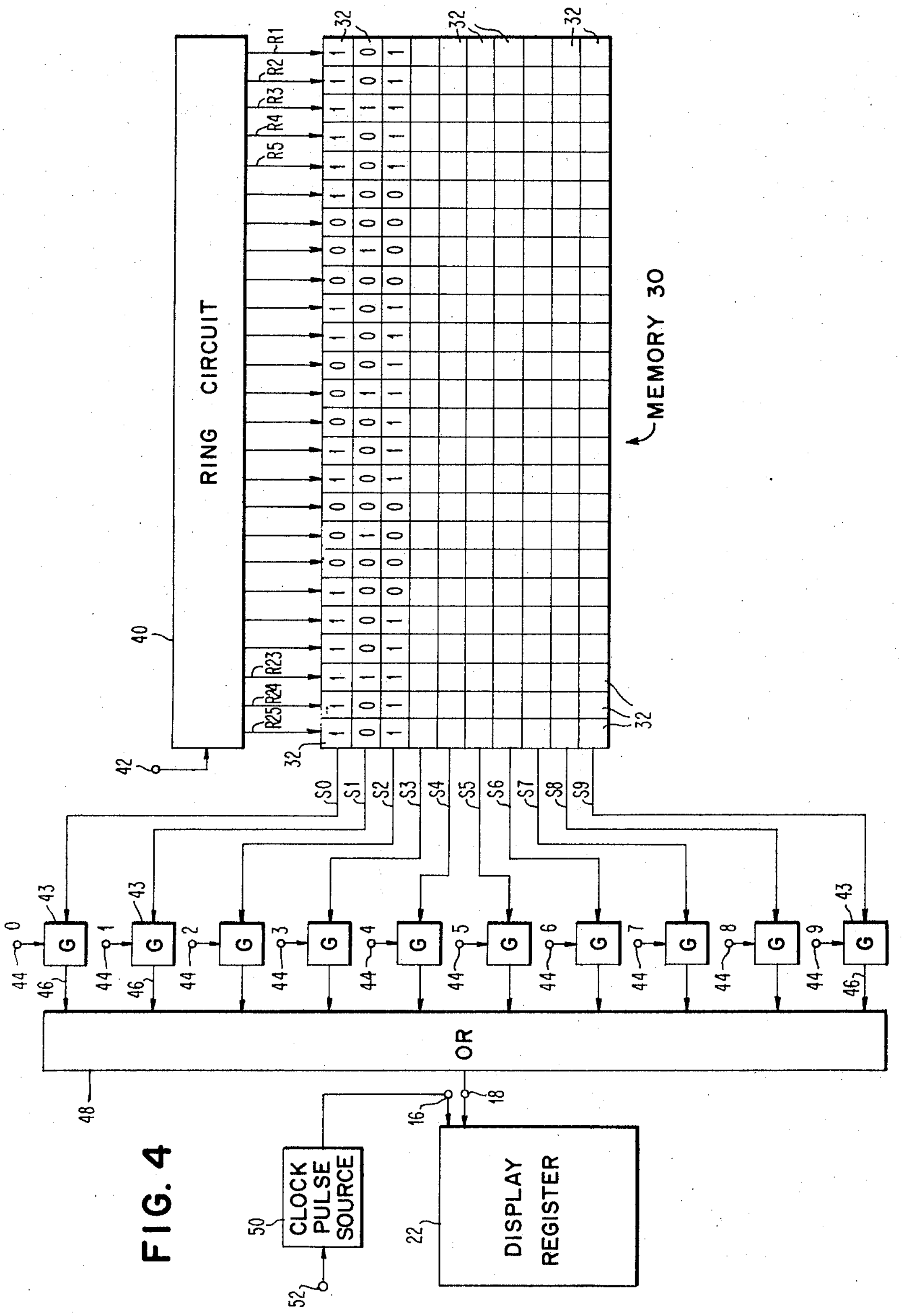
FIGS. 4 and 5 are circuit diagrams illustrating embodiments of the invention including the display register of FIGS. 1 and 2, respectively, combined with a memory and control circuitry for entering different binary words into the display register.

Circuitry for providing the necessary pattern of binary information is shown in FIG. 4 wherein the display register of FIG. 1 is represented by the block 22 of FIG. 1A. This circuit includes a memory 30 shown in block form which includes ten horizontal rows of storage devices with twenty-five storage devices in each row. Each storage position of the memory is represented by a small square 32 and each row of the memory stores the binary word for one of the ten characters to be displayed. The binary words for 0, 1 and 2 are shown in the upper three rows of the memory and binary words for the decimal characters 3 through 9 are stored in the remaining seven rows of the memory. The binary words stored in memory 30 are read out of the memory by energizing read out drive lines R1 through R25 under control of a ring circuit 40. Ring circuit 40 is operated under control of signals applied at a terminal 42. A signal applied at this terminal causes the ring circuit to emit a series of twenty-five pulses which are applied in order to the read out lines R25 through R1 of memory 30. The first of these signals applied to line R25 reads out the binary bits stored in the first column of the memory and causes signals to be generated on a group of ten sense lines S0 through S9 indicative of the information stored in the first column of the memory. These output signals are generated in parallel and are applied to a group of ten gate circuits 43. Each of these gate circuits corresponds to one of the ten characters to be displayed and each is controlled by the application of a signal to an input terminal 44 provided for this purpose. Adjacent to each of these terminals there is indicated the character to be displayed when the gate is opened by the application of an input signal to its input terminal 44.

Assuming a zero is to be displayed by display register 22, a signal is applied to the uppermost gate circuit so that only the binary information on the uppermost sense line S0 is transmitted and the signals on the other sense lines S1 through S9 do not pass their gate circuits. The first signal representing a binary one is passed through the zero gate circuit and is applied by an output line 46 to an OR circuit 48. The output of OR circuit is connected to the information input terminal 18 of the shift register of display register 22.

During the same input time interval that the first information representing signal reaches terminal 18, an advance signal is applied by a clock pulse source 50 to advance terminal 16. This clock pulse source is activated to supply a series of twenty-five advance pulses during each input operation under the control of signals applied on an input terminal 52.

After the first binary digit has been transferred from the upper left hand position of the memory 30 to the first storage T1 of the shift register (see FIG. 1), the successively applied pulses to read out drive lines R24 through R1 cause the remaining binary digits to be transferred to the shift register and advanced by the clock pulses from source 50. After twenty-five such read out operations, the shift registers is storing the binary word in the top row of the memory and is in the condition illustrated in FIG. 3A. The associated diodes then emit light to display the character zero.

In the description given above the memory 30 is a nondestructive memory which does not require the information read out to be restored. It is of course understood that destructive read out memories may be employed with conventional circuitry for rewriting the information destroyed during a read out operation. It is also apparent that the information in the form of the binary words stored in the memory 30 may be changed in any one or more rows by conventional writing operations in the memory. By merely changing the binary word in one or more rows of the memory and thereby changing the word serially entered in the shift register of the display register 22, the display can be controlled to display any desired pattern or character other than the numerals 0 through 9. Similarly, a larger memory with appropriately associated circuitry can be provided to handle more binary words and therefore allow a greater number of characters to be displayed. It is for this reason, to provide a display having the flexibility to generate large numbers of different characters, that the array of FIG. 1 is provided with diodes 10 at positions A7 and A17 and associated bistable devices in the shift register, even though for the generation of the characters zero through nine shown in FIGS. 3A through 3j, the diodes in these positions are not required. It should be further noted that it is not necessary to reset the shift register when a new character is to be displayed since the entry of the new binary word shifts the old word out of the register.

Figure 2:
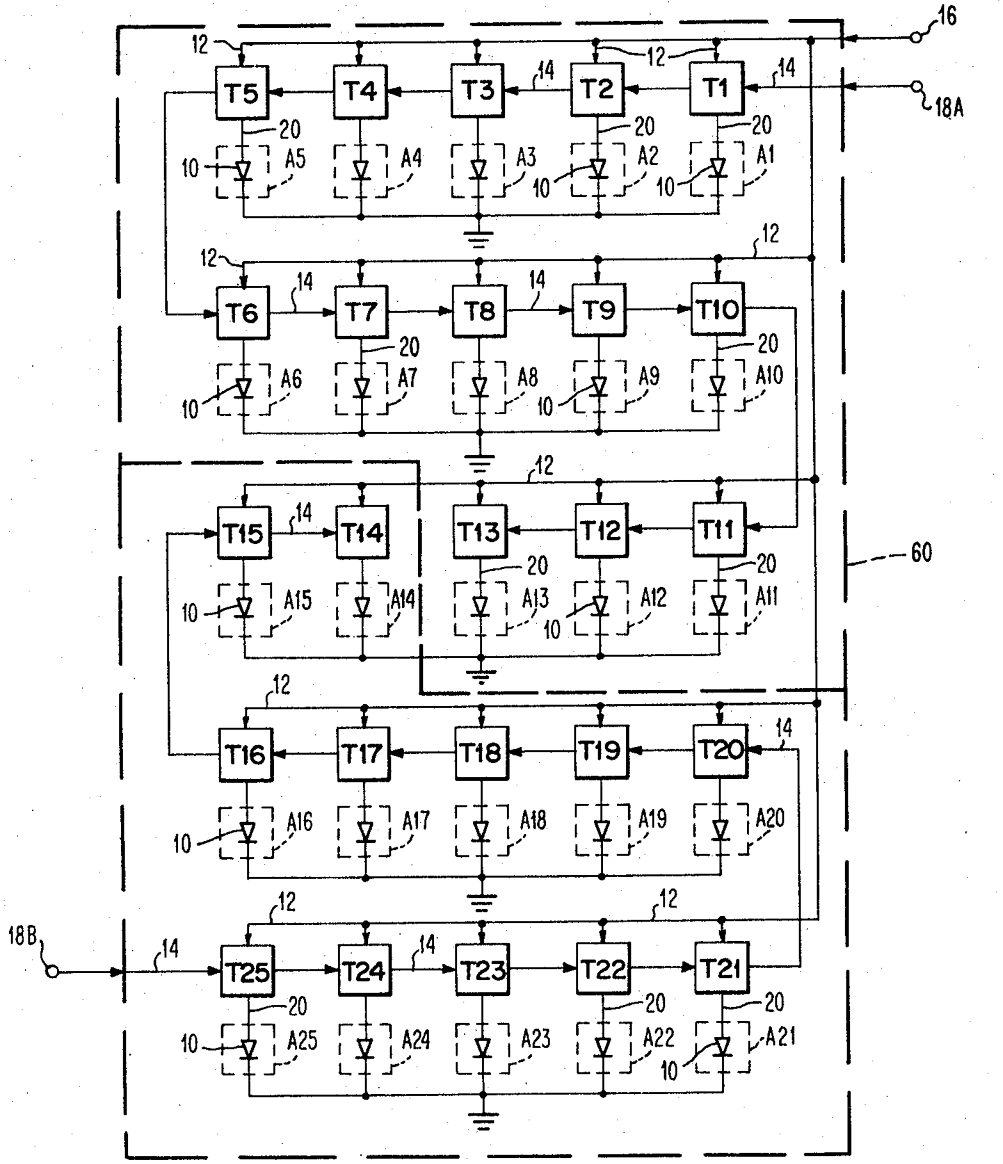
Figure 2A:
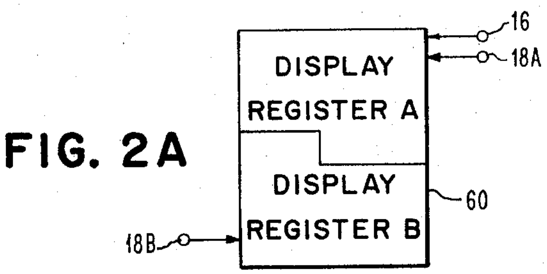
Figure 5:
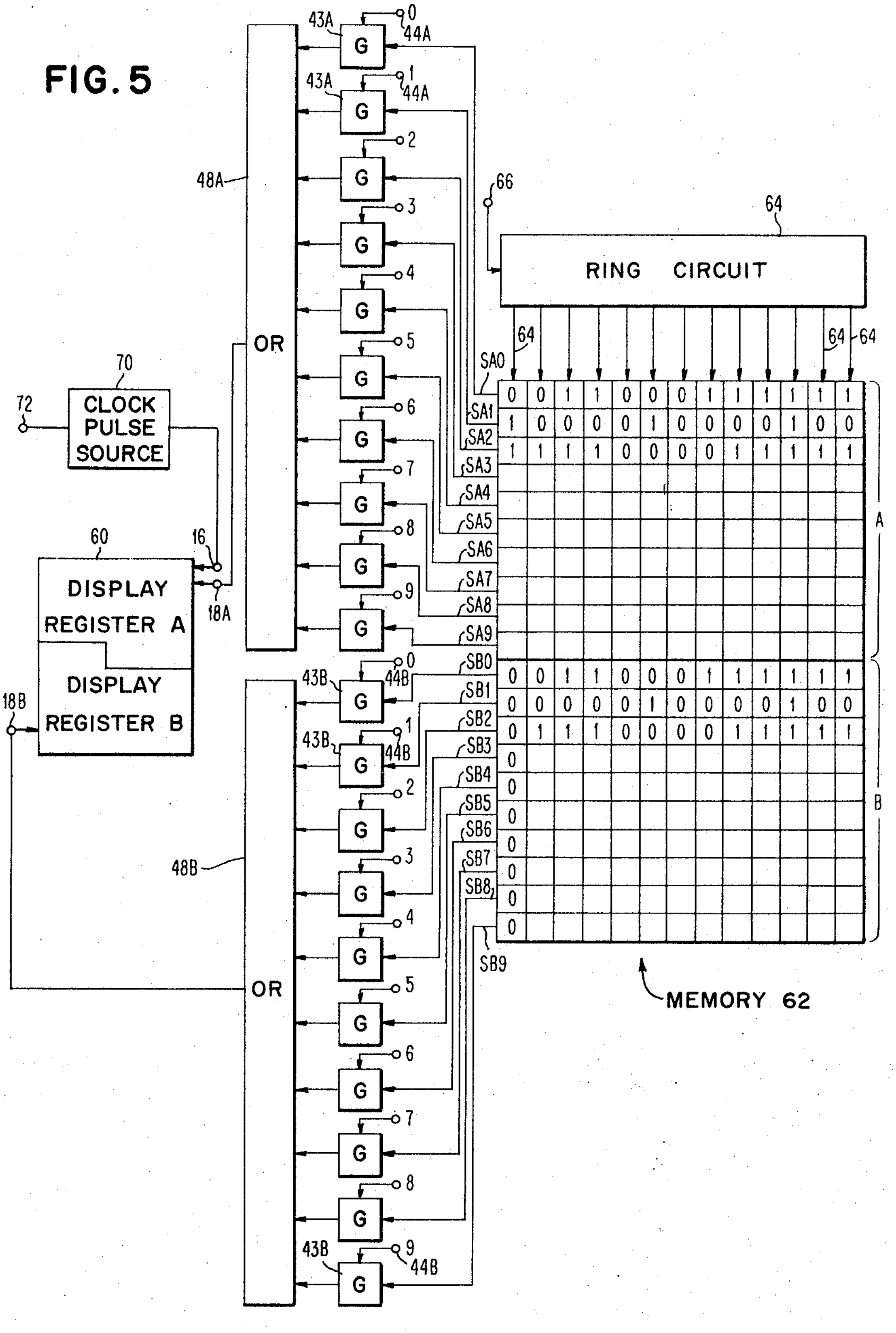

A further embodiment of the invention is illustrated in FIGS. 2, 2A and 5. In this embodiment is as illustrated in FIG. 2 the same arrangement of twenty-five light emitting diodes 10 and twenty-five bistable circuits T1 through T25 arranged in a five by five matrix is employed. For this reason the same reference numbers are used in FIG. 2 as were used in FIG. 1. The embodiment of FIG. 2 differs from that of FIG. 1 only in that there are provided two shift registers, one a thirteen stage register, termed the A register including stages T1 through T13, and a second twelve stage register, termed the B register including stages T25 through T14. Both registers receive advance signals from outputs 12 connected to advance input terminal 16 and the upper register (stages T1 through T13) receives its information inputs at an information input terminal 18A. The second register receives its information inputs at a terminal 18B which is connected to the input 14 for bistable device T25 which forms the first stage of this register. The same patterns of binary information in the various register positions as is shown in FIGS. 3A through 3J is required to display the characters zero through nine in the embodiment of FIG. 2. Circuitry for entering this information with the two registers is shown in FIG. 5 wherein the circuit of FIG. 2 is represented by a block designated 60 shown in FIG. 2A.

The circuit of FIG. 5 includes a memory 62 which includes twenty rows of binary storage positions with thirteen storage positions in each row. The memory may be considered to be divided into two sections. An upper or A section of the memory contains the ten thirteen bit binary words which are entered in the A register of the display device and a lower or B section of the memory stores the ten twelve bit words which are entered into the B register of the display device. The thirteen bits to be entered into the A register to display the character 0, 1 and 2 are shown in the first three rows of the upper or A section, and the twelve bits to be entered into the B register are shown in the twelve columns of the first three rows of the B section of the memory beginning with the second column from the left. Zeros are stored in the first column of each of the ten rows in the lower or B section of the memory 12 to allow the proper binary words to be entered into the B register under control of the same advance pulses as are used to transfer the thirteen bit words from the upper or A section of the memory into the A register of the display.

The memory is read out under the control of signals applied successively to a group of thirteen read drive lines, one for each column of the memory. Signals are applied to these lines 64 in succession from left to right by a ring circuit 64 when it is activated by a signal applied to its input terminal 66. When the read out drive line 64 for the first column of the memory is energized, ten bits are read out of the A section of the memory to produce appropriate output signals on sense lines SA0 through SA9. At the same time output signals representing the information stored in the first column in the B section (here all zeros) are produced on output sense lines SB0 through SB9. During each successive energization of a read drive line, information output signals are simultaneously produced on these two groups of output sense lines.

Output sense lines SA0 through SA9 are connected to ten gates 43A and output sense lines SB0 through SB9 are connected to ten gates 44A. Each of these gates has an input terminal 44 and one gate in each group has its input terminal energized to allow the gates to pass the serially applied binary bits representing the A and B portions of the character to be displayed. The output of the upper gates 44A are applied to an OR circuit 48A and then to the input terminal 18A of the A register of the display. The outputs of the lower gates are similarly passed through an OR circuit 48B to the input terminal 18B for the B register of the display. As in the embodiment of FIG. 1 appropriately timed advance pulses are applied by a clock pulse source, here designated 70, under control of a signal applied to its input 72. This source applies a series of thirteen advance signals to the advance input terminal 16 and from there to each of the storages in each of the A and B registers in the display during each character entry operation.

It will be readily apparent from the description of the embodiments given above that the bistable devices of the display may be connected to form more than two registers. For example five registers can be formed, one for each row. As the number of registers is increased the number of signals necessary to be applied and therefore the time required to generate a new character is decreased. It is further obvious that the display of the present invention may be controlled and operated by memory, gating and pulse circuits which form part of a general purpose computer, and that complete flexibility in the characters and patterns displayed is easily provided in this type of application by appropriate computer programs. However, the practice of the invention is not limited to the operation of the display with a general purpose computer nor in its broadest scope is a memory required to supply the inputs to the register(s) of the display. For example, the stages of the registers can be connected to form a counter in which case the character displayed is controlled by the number of input pulses applied to the counter. Though an embodiment of this type requires a larger number of input signals to generate a character in the display, it must be remembered that using present day high speed electronic circuits very large numbers of pulses can be generated in the time normally allowed to change characters in a visual display.

While the invention has been particularly shown and described with reference to preferred embodiments thereof, it will be understood by those skilled in the art that various changes in form and details may be made therein without departing from the spirit and scope of the invention.

What is claimed is:

1. A pattern display comprising:

(a) a plurality of light emitting devices each having an on condition and an off condition and arranged in a display matrix;

(b) a plurality of bistable devices one for each of said light emitting devices and each connected to a corresponding one of said light emitting devices to control the light emitting device to be on when the bistable device is in one of its stable states and off when the bistable device is in the other of its stable states;

(c) means connecting said bistable devices to each other to form first and second separate shift registers in each of which binary information is advanced from one bistable device to the next in the register;

(d) first and second input terminals each connected to a corresponding one of said first and second shift registers;

(e) memory means connected to said input terminals for selectively applying serial inputs to each of said first and second input registers;

(f) said memory means including a memory having first and second sections;

(g) said first section storing binary words corresponding to first portions of patterns to be displayed by the light emitting devices connected to the bistable devices forming said first shift register;

(h) said second section of said memory storing binary words corresponding to second portions of patterns to be displayed by the light emitting devices connected to the bistable devices forming said second shift register;

(i) and means for simultaneously reading out words from said first and second sections of said memory and for simultaneously applying pulses representing said words to said first and second input terminals of said first and second shift registers.

References Cited

UNITED STATES PATENTS

| | | | |
|---|---|---|---|
| 3,273,140 | 9/1966 | Foster et al. ---- | 340—324 X |
| 3,283,313 | 11/1966 | Bramer --------- | 340—324 X |
| 3,357,010 | 12/1967 | Sweeney ---------- | 340—324 |

BERNARD KONICK, *Primary Examiner.*

JOSEPH F. BREIMAYER, *Assistant Examiner.*

U.S. Cl. X.R.

340—174, 324, 334